(12) United States Patent
Heiss (10) Patent No.: US 8,119,008 B2
(45) Date of Patent: Feb. 21, 2012

(54) FLUID PURIFICATION METHODS AND DEVICES

(76) Inventor: Christopher Heiss, Colorado Springs, CO (US)

( * ) Notice: Subject to any disclaimer, the term of this patent is extended or adjusted under 35 U.S.C. 154(b) by 873 days.

(21) Appl. No.: 11/674,983

(22) Filed: Feb. 14, 2007

(65) Prior Publication Data
US 2008/0087603 A1 Apr. 17, 2008

Related U.S. Application Data

(60) Provisional application No. 60/806,899, filed on Jul. 10, 2006.

(51) Int. Cl.
*B01D 61/02* (2006.01)
*B01D 15/00* (2006.01)

(52) U.S. Cl. ............... 210/652; 210/900; 210/748.01; 210/748.16; 210/748.19; 210/639; 210/758; 210/754; 210/760; 210/767; 205/751; 205/752; 205/756; 205/749

(58) Field of Classification Search .............. 210/151, 210/259, 266, 631, 900, 617, 618, 620, 650, 210/767, 652, 663, 665, 669, 679, 681, 666, 210/704, 705, 721, 729, 732, 748.01, 748.16, 210/748.19, 748.18, 749, 760, 758, 765, 210/195.2, 196, 200, 639; 204/276–277
See application file for complete search history.

(56) References Cited

U.S. PATENT DOCUMENTS

| | | | | |
|---|---|---|---|---|
| 3,589,998 A | * | 6/1971 | Rice et al. | 210/639 |
| 3,617,550 A | * | 11/1971 | Elata et al. | 210/637 |
| 3,836,457 A | * | 9/1974 | Gross | 210/655 |
| 3,969,203 A | * | 7/1976 | Ramirez | 205/744 |
| 4,083,781 A | * | 4/1978 | Conger | 210/651 |
| 4,141,825 A | * | 2/1979 | Conger | 210/638 |
| 4,169,789 A | | 10/1979 | Lerat | |
| 4,189,381 A | * | 2/1980 | Laferty et al. | 210/665 |
| 4,273,660 A | | 6/1981 | Beitzel | |
| 4,349,431 A | | 9/1982 | Axenko et al. | |
| 4,361,485 A | | 11/1982 | Boonstra | |
| 4,391,712 A | | 7/1983 | Tyler et al. | |
| 4,563,272 A | | 1/1986 | Yoshida et al. | |
| 4,643,902 A | * | 2/1987 | Lawhon et al. | 426/271 |
| 4,680,109 A | | 7/1987 | Yamada et al. | |
| 4,702,842 A | | 10/1987 | Lapierre | |
| 4,772,385 A | | 9/1988 | Yamada et al. | |

(Continued)

OTHER PUBLICATIONS

Lozier e al "Evaluation of Bioglogic and Non-Biologic Methods for Assessing Virus Removal by and Integrity of High Pressure Membrane Systems," American Water Works Association Membrane Technology Conference, 2003, pp. 1-17.

(Continued)

*Primary Examiner* — Tony G Soohoo
*Assistant Examiner* — David C Mellon
(74) *Attorney, Agent, or Firm* — Marsh Fischmann & Breyfogle LLP (57) ABSTRACT

Disclosed is a method of purifying fluid, typically an aqueous fluid steam, with the method involving at least two reverse osmosis stages with retentate from a first reverse osmosis stage being subjected to the second reverse osmosis stage, and with intermediate treatment of retentate from the first reverse osmosis stage by exposure to an electric field. The intermediate treatment may involve electrocoagulation to remove sparingly-soluble compounds and permit enhanced reverse osmosis recovery. Additional treatment may be performed prior to the first reverse osmosis stage, between the first reverse osmosis stage and the intermediate treatment with an electric field, between such intermediate treatment and the second reverse osmosis stage, or after the second reverse osmosis stage.

6 Claims, 6 Drawing Sheets

U.S. PATENT DOCUMENTS

| | | | | |
|---|---|---|---|---|
| 4,808,287 A * | 2/1989 | Hark | | 210/637 |
| 4,872,959 A | 10/1989 | Herbst et al. | | |
| 4,944,882 A * | 7/1990 | Ray et al. | | 210/640 |
| 4,959,237 A * | 9/1990 | Walker | | 426/330.5 |
| 5,059,317 A | 10/1991 | Marius et al. | | |
| 5,236,595 A | 8/1993 | Wang et al. | | |
| 5,238,574 A * | 8/1993 | Kawashima et al. | | 210/652 |
| 5,244,579 A | 9/1993 | Horner et al. | | |
| 5,252,219 A * | 10/1993 | Xu | | 210/640 |
| 5,256,299 A | 10/1993 | Wang et al. | | |
| 5,266,202 A | 11/1993 | Okonogi et al. | | |
| 5,272,091 A | 12/1993 | Egozy et al. | | |
| 5,385,653 A | 1/1995 | Tamarkin | | |
| 5,385,664 A * | 1/1995 | Oinuma et al. | | 210/151 |
| 5,422,013 A | 6/1995 | Hirofuji | | |
| 5,494,573 A | 2/1996 | Schoenmeyr et al. | | |
| 5,496,466 A | 3/1996 | Gray | | |
| 5,501,798 A * | 3/1996 | Al-Samadi et al. | | 210/652 |
| 5,547,584 A | 8/1996 | Capehart | | |
| 5,569,384 A * | 10/1996 | Saatweber et al. | | 210/651 |
| 5,573,662 A * | 11/1996 | Abe et al. | | 210/188 |
| 5,587,057 A | 12/1996 | Metzler et al. | | |
| 5,589,066 A | 12/1996 | Gray | | |
| 5,611,907 A | 3/1997 | Herbst et al. | | |
| 5,647,973 A | 7/1997 | Desaulniers | | |
| 5,725,758 A | 3/1998 | Chace et al. | | |
| 5,741,416 A | 4/1998 | Tempest, Jr. | | |
| 5,788,858 A | 8/1998 | Acernese et al. | | |
| 5,849,197 A * | 12/1998 | Taylor et al. | | 210/652 |
| 5,897,780 A | 4/1999 | Grabowski et al. | | |
| 5,972,216 A | 10/1999 | Acernese et al. | | |
| 6,054,168 A * | 4/2000 | Lioutas et al. | | 426/599 |
| 6,074,551 A | 6/2000 | Jones et al. | | |
| 6,077,435 A | 6/2000 | Beck et al. | | |
| 6,090,294 A | 7/2000 | Teran et al. | | |
| 6,187,200 B1 * | 2/2001 | Yamamura et al. | | 210/652 |
| 6,217,773 B1 | 4/2001 | Graham | | |
| 6,328,896 B1 | 12/2001 | Atnoor et al. | | |
| 6,398,965 B1 | 6/2002 | Arba et al. | | |
| 6,402,954 B1 | 6/2002 | O'Keefe, Jr. | | |
| 6,475,371 B1 * | 11/2002 | Shirahata et al. | | 205/742 |
| 6,488,835 B1 | 12/2002 | Powell | | |
| 6,508,936 B1 * | 1/2003 | Hassan | | 210/652 |
| 6,537,456 B2 | 3/2003 | Mukhopadhyay | | |
| 6,607,668 B2 | 8/2003 | Rela | | |
| 6,613,201 B1 | 9/2003 | Hecking | | |
| 6,613,202 B2 | 9/2003 | Herbst et al. | | |
| 6,613,217 B1 | 9/2003 | Gilmore | | |
| 6,651,383 B2 | 11/2003 | Grott | | |
| 6,663,783 B2 | 12/2003 | Stephenson et al. | | |
| 6,673,321 B2 | 1/2004 | Weakly et al. | | |
| 6,679,988 B2 | 1/2004 | Gsell | | |
| 6,689,271 B2 | 2/2004 | Morkovsky et al. | | |
| 6,746,593 B2 | 6/2004 | Herbst | | |
| 6,780,292 B2 | 8/2004 | Hermann et al. | | |
| 6,783,687 B2 | 8/2004 | Richard | | |
| 6,797,179 B2 | 9/2004 | Arnaud | | |
| 6,800,206 B2 | 10/2004 | Robinson | | |
| 6,849,178 B2 | 2/2005 | Hecking | | |
| 6,866,757 B2 | 3/2005 | Gilmore | | |
| 6,908,546 B2 | 6/2005 | Smith | | |
| 6,936,172 B2 | 8/2005 | Hebert | | |
| 6,972,077 B2 | 12/2005 | Tipton et al. | | |
| 7,517,456 B2 * | 4/2009 | Liao et al. | | 210/652 |
| 2004/0007452 A1 | 1/2004 | Warren et al. | | |
| 2004/0099607 A1 * | 5/2004 | Leffler et al. | | 210/704 |
| 2005/0087484 A1 | 4/2005 | Lambie | | |
| 2005/0121388 A1 | 6/2005 | Wood et al. | | |
| 2005/0139530 A1 | 6/2005 | Heiss | | |
| 2005/0230312 A1 | 10/2005 | Chancellor | | |
| 2006/0060532 A1 | 3/2006 | Davis | | |
| 2008/0087603 A1 | 4/2008 | Heiss | | |
| 2009/0107915 A1 * | 4/2009 | Skinner et al. | | 210/636 |

OTHER PUBLICATIONS

W. Dickinson Burrows and Sara E. Renner, MCHB-TS-EWS (40) Medical Issues Information Paper No. IP31-017, "Biological Warfare Agents as Potable Water Threats," Water Supply Management Program, U.S. Army Center for Health Promotion and Preventive Medicine, Oct. 1998, pp. 1-44.

Burrows, et al., MCHB-TS-EWS (40), Medical Issues Information Paper No. 31-018, "Biological Warfare Agents in Drinking Water: Guide for Field Personnel", Water Supply Management Program, U.S. Army Center for Health Promotion and Preventive Medicine, Oct. 1998, pp. 1-33.

U.S. Appl. No. 12/168,886, filed Jul. 7, 2008, Heiss.

Technical Bulletin "Sanitary Control and Surveillance of Field Water Supplies," TB MED 577, NAVMED P-5010-9, Appendix D, AFOSH Standard 48-7, Departments of the Army, Navy and Air Force, Washington, D.C., Feb. 1999, pp. 1-196.

* cited by examiner

FLUID PURIFICATION METHODS AND DEVICES

CROSS REFERENCE TO RELATED APPLICATION

This application claims the benefit of priority under 35 U.S.C. §119(e) to U.S. Provisional Patent Application Ser. No. 60/806,899 filed Jul. 10, 2006, which is incorporated herein by reference.

FIELD OF THE INVENTION

The invention relates to the purification of solutions containing impurities by membrane separation. Particularly, this invention relates to increasing the recovery of membrane separation processes.

BACKGROUND OF THE INVENTION

Membranes are being applied to treat numerous water problems across the world. Membranes are utilized to remove impurities from solutions and have the ability to remove both dissolved and suspended matter. Membranes are deployed in a variety of pore sizes and in a wide variety of different materials.

The primary limiting factor to membrane applications is the waste stream generated by the separation process that may be a high percentage of the feed stream to the system. Disposal of the waste stream can be costly and in many applications there is simply nowhere for the waste stream to go. In these applications, a zero liquid discharge system is required. Typically, thermal means are used to further concentrate and eventually dry the waste stream at a high cost. Increasing the recovery of membrane systems would therefore provide substantial cost savings and allows membrane applications that would otherwise be impossible.

Membranes that have the ability to remove dissolved inorganic matter are typically referred to as hyperfiltration membranes or reverse osmosis membranes. However, many specialized formulations of membrane material have been created that exhibit varied rejection characteristics. These membranes have been described as nanofiltration membranes, low-pressure membranes, low-rejection membranes, energy saving membranes, and the like. For the purposes of this disclosure, the use of any membrane that rejects dissolved inorganic material will be considered reverse osmosis.

Reverse osmosis, as the name suggests, is the opposite of osmosis. Solutions have an osmotic pressure that is determined by the amount of dissolved matter in the solution. The osmotic pressure of a solution must be overcome for reverse osmosis to take place. Therefore, the ability to concentrate a solution by reverse osmosis is limited by the pressure that can be applied to the membrane. Currently, standard, commercially-available reverse osmosis membranes have a maximum operating pressure of 1200 PSI. However, there are custom membranes in standard configurations that have operating pressures up to 1500 PSI. The maximum operating pressure of the membrane will determine the maximum concentration attainable by reverse osmosis for any solution.

The maximum recovery of a reverse osmosis system is achieved at the maximum concentration of the concentrate stream. If the osmotic pressure limit is attained in the concentrate stream, no further water will pass through the membrane and the maximum attainable recovery is achieved. However, virtually all solutions that are processed by reverse osmosis will foul the membranes at concentrations much lower than the osmotic pressure limit.

There are several categories of contaminants that can foul membranes, including: particulate matter, organisms that multiply within the membrane system, compounds that tend to adhere to the membrane surface, and dissolved contaminants that exceed their solubility and precipitate as they are concentrated in the membrane system. Particulate matter is present in virtually all water sources and it is therefore common practice to filter water through cartridge type filters with a pore size of 1-5 microns prior to processing by reverse osmosis. This prevents large particles that can plug the feed spacer from entering membranes. The particles that are smaller than the prefilter pore size are swept through the membranes by the cross flow. At standard recoveries of 75-90%, the small particles typically do not cause fouling problems. At recoveries exceeding 90%, particulate fouling can be problematic. Uncontrolled growth of organisms in membrane systems will cause membrane fouling. This will occur regardless of the recovery rate. There are numerous compounds that tend to adhere to membranes. They are typically organic compounds. Some compounds can be removed by cleaning agents and some are considered permanent. The fouling by these compounds is primarily a function of overall throughput of fluid through the system and the concentration in the feed stream of these contaminants. The recovery of the system has a marginal effect. Dissolved contaminants that exceed their solubility as they are concentrated in the membrane system are very common. These include the carbonate, sulfate, and fluoride salts of calcium, magnesium, strontium, and barium and also silica. These sparingly-soluble compounds typically define the recovery limit in reverse osmosis systems.

Several methodologies have been utilized to address the membrane fouling associated with sparingly-soluble compounds. For many years it was common to utilize cation exchange water softeners as pretreatment to reverse osmosis. This practice has subsided due to the high cost associated with installing and regenerating water softeners, especially for water sources where the cation exchange load is high, as is common in many ground water supplies.

U.S. Pat. No. 6,537,456 describes a process utilizing weak acid cation exchange prior to reverse osmosis. This process is plagued by the same problem as other cation exchange processes in that there is an ion-for-ion exchange between the resin bed and the water. Upon exhaustion of the bed, it must be regenerated and the regenerant chemical has significant cost. Furthermore, transport of hazardous chemicals such as acids represents a logistical problem in large reverse osmosis applications.

Numerous inventions have been disclosed that purportedly inhibit scale deposition on reverse osmosis membranes by use of magnetic or electrical fields. U.S. Pat. Nos. 6,936,172, 6,217,773 and 6,651,383 all pertain to controlling scale formation by magnetic or electrical fields. However, there has not been commercial application of this technology due to unpredictable performance and high cost. Scale inhibiting compounds have been developed that prohibit crystal formation and can prevent scale from attaching to the membrane surface. This is the most prevalent method of controlling precipitation of sparingly-soluble compounds in commercial, industrial, and municipal reverse osmosis applications.

An important aspect of membrane system design is maintenance of adequate cross flow velocity at the surface of the membrane. This is necessary to prevent deposition of particulate mater on the membrane surface, to minimize the zone of high concentration of dissolved matter at the membrane surface as permeate diffuses across the membrane and contaminants are left behind, and to allow scale-inhibiting chemicals to have adequate contact with compounds over their solubility level.

Commercial, industrial, and municipal membrane applications involve multiple individual membrane elements. These are placed in pressure vessels and arranged in an appropriate manner to provide adequate cross flow. Each individual element is limited to approximately 15% recovery. However, placing the elements in arrays of multiple elements allows higher recovery through the entire system. Membrane element manufacturers provide software to the designers of membrane systems that computes the flow, pressure, and recovery values throughout the chosen membrane array. This data is used to determine the optimum arrangement of elements in a system to attain the desired flow and recovery. Systems are typically constructed of multiple vessels with each vessel containing six elements. The concentrate from the first element becomes the feed to the second vessel and so forth, comprising a series of six elements. The permeate flow from all the elements is connected in a common center tube. These vessels are arranged in banks of vessels in parallel. When the concentrate from one bank becomes the feed to a smaller number of vessels in a succeeding bank, the succeeding bank is referred to as another stage of membranes. Seawater systems typically consist of a single stage and are operated at a relatively low recovery of approximately 35%. The most common array of membranes for brackish water consists of two stages in which the first stage has approximately twice as many membrane vessels as the second stage. Such a system has a typical overall recovery of approximately 75% while maintaining adequate flow velocity to each membrane. It is possible to maintain adequate flow velocities while increasing overall recovery by adding another stage with approximately half as many membranes as the second stage for an overall recovery of approximately 90%. However, it is common for sparingly-soluble compounds to reach maximum saturation capability with scale inhibitor technology at this level of recovery.

Manufacturers of scale inhibitors provide software to the designers of membrane systems that evaluate solubility of various sparingly-soluble compounds at various recovery rates, scale inhibitor dosage, and influent water characteristics. By using the software provided by membrane manufacturers and scale inhibitor manufacturers, it is possible to accurately predict the maximum recovery design for a reverse osmosis system at any given flow rate and water quality.

Unfortunately, the predicted recovery based on these designs are too low to make these processes feasible or too costly to realistically operate under typical field conditions. Therefore, there is a need for alternative system designs that substantially increase recovery beyond the determined maximum from the manufacturer's software for any given water supply. This would preferably be accomplished by treating the concentrate to remove sparingly-soluble compounds and allow further concentration by additional stages of reverse osmosis.

There are patents and published patent applications describing electrolytic treatment of aqueous solutions to remove ions, and/or prevent fouling, biofouling or scaling. For example, US Patent Application Publication No. 2006/0060532 discloses a process in which concentrate from a sea water reverse osmosis system is subjected to electrodialysis, utilizing charged membranes to remove or exchange certain salts. U.S. Pat. No. 6,217,773 discloses a method of placing an electrical field around a RO membrane to reduce fouling.

There are several US patent applications that disclose methods of reducing biogrowth or disinfecting water with electrical devices including U.S. Pat. Application Publication Nos. 2005/0230312 and 2005/0087484. U.S. Pat. No. 6,783,687 and US Pat. Application Publication No. 2004/0007452 both describe a method of desalting water utilizing an electrical field to separate ions from water.

U.S. Pat. No. 5,501,798 discloses a process for attaining higher recovery from reverse osmosis by removing sparingly-soluble compounds from reverse osmosis concentrate. This process utilizes pH adjustment and/or introduction of seed crystals to the concentrate water to precipitate sparingly-soluble compounds which are then filtered from the concentrate solution. The solution is then fed back into the inlet of the single reverse osmosis processor. There are several issues that make this design impractical. First, while adjusting the pH to the precipitation point of sparingly-soluble compounds such as calcium carbonate is an obvious method described in fundamental chemistry texts, it is impractical from a cost and materials handling standpoint for commercial application. The pH would also have to be adjusted back down following the precipitation of these compounds, requiring copious amounts of both caustic and acid. Additionally, seed crystals have been shown experimentally to have limited ability to precipitate compounds from reverse osmosis concentrate. Further, these seed crystals are specific to particular compounds requiring adaptation of this method for each sparingly-soluble compound that may contaminate the fluids being purified. Also, return of the concentrate to the inlet of the reverse osmosis processor limits application of the process to smaller, batch-type applications. Therefore, this method of removing sparingly-soluble compounds from reverse osmosis concentrate is not effective at a cost or volume useful to purify contaminated fluids.

Thus, there is a need for a fluid processing procedure that will economically prevent or reduce fouling of the membranes of a reverse osmosis unit to allow high throughput at or close to the osmotic pressure limit.

SUMMARY OF THE INVENTION

Figure 2:
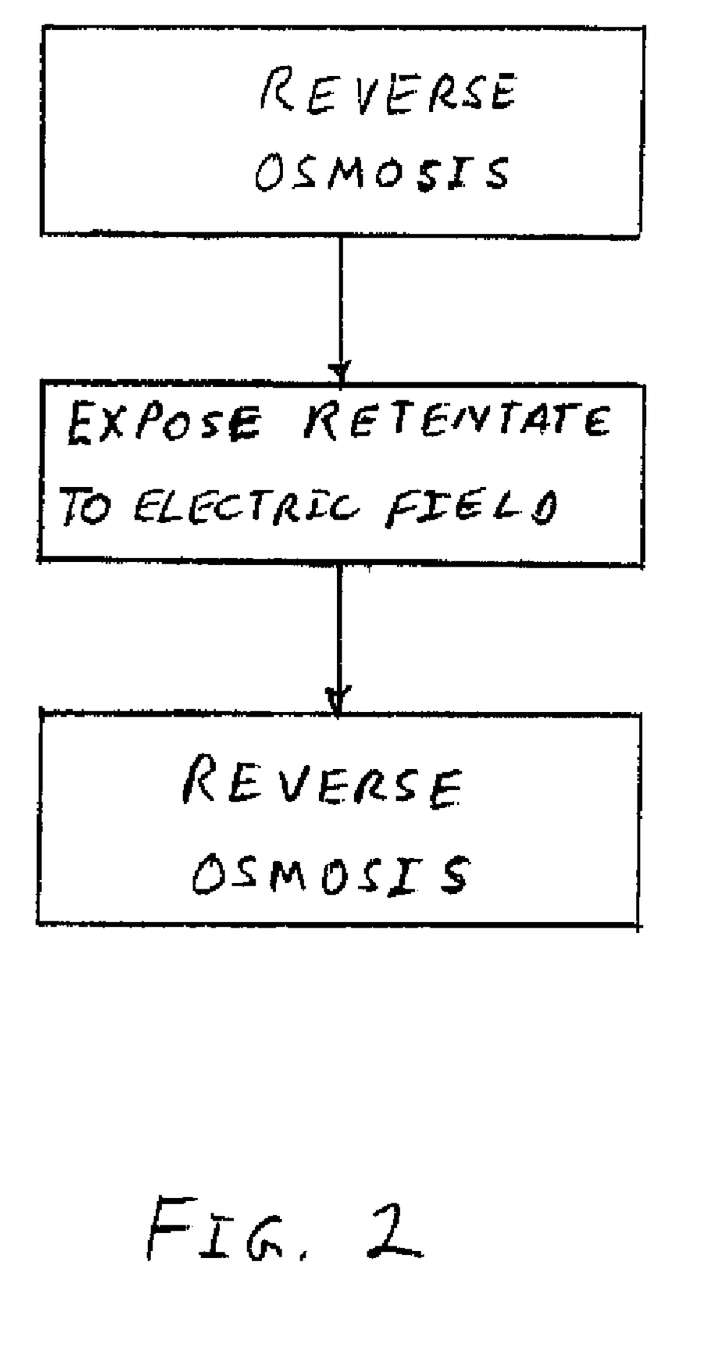
FIG. 2 shows a process block diagram of one embodiment of the invention.
Figure 3:
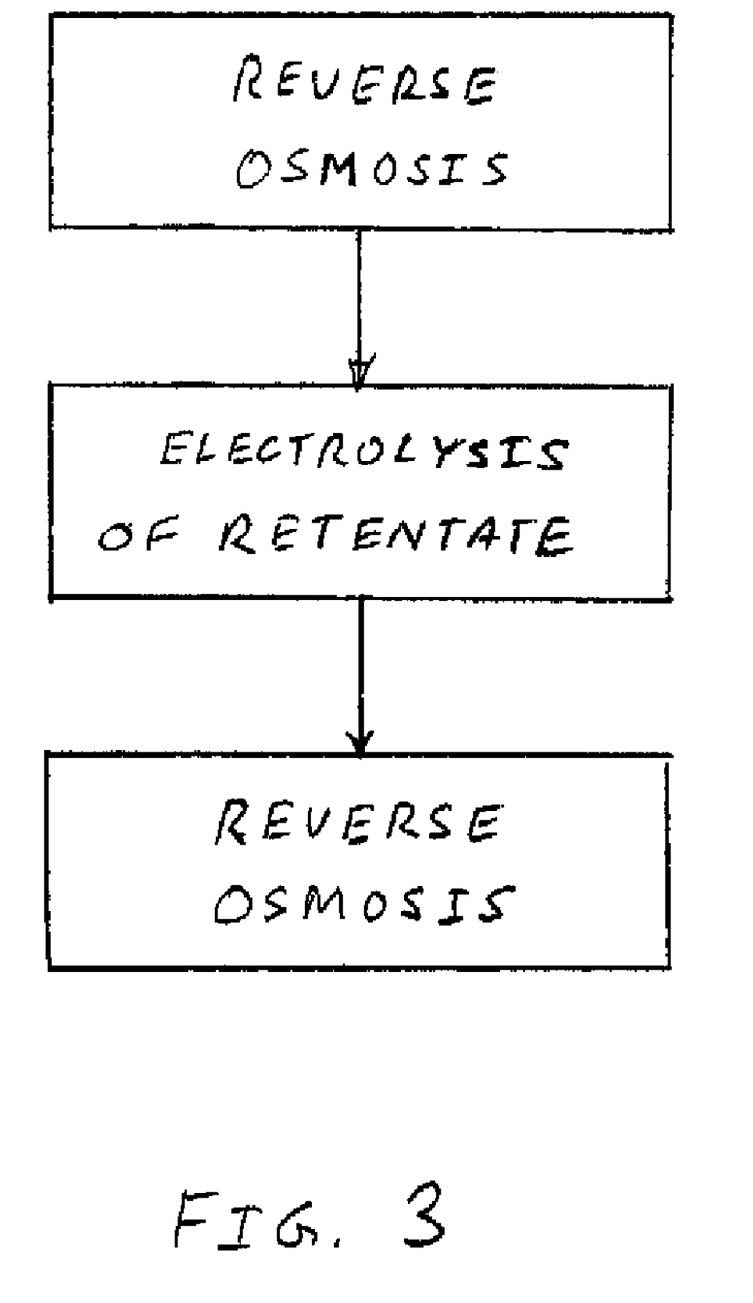
FIG. 3 shows a process block diagram of another embodiment of the invention.
Figure 4:
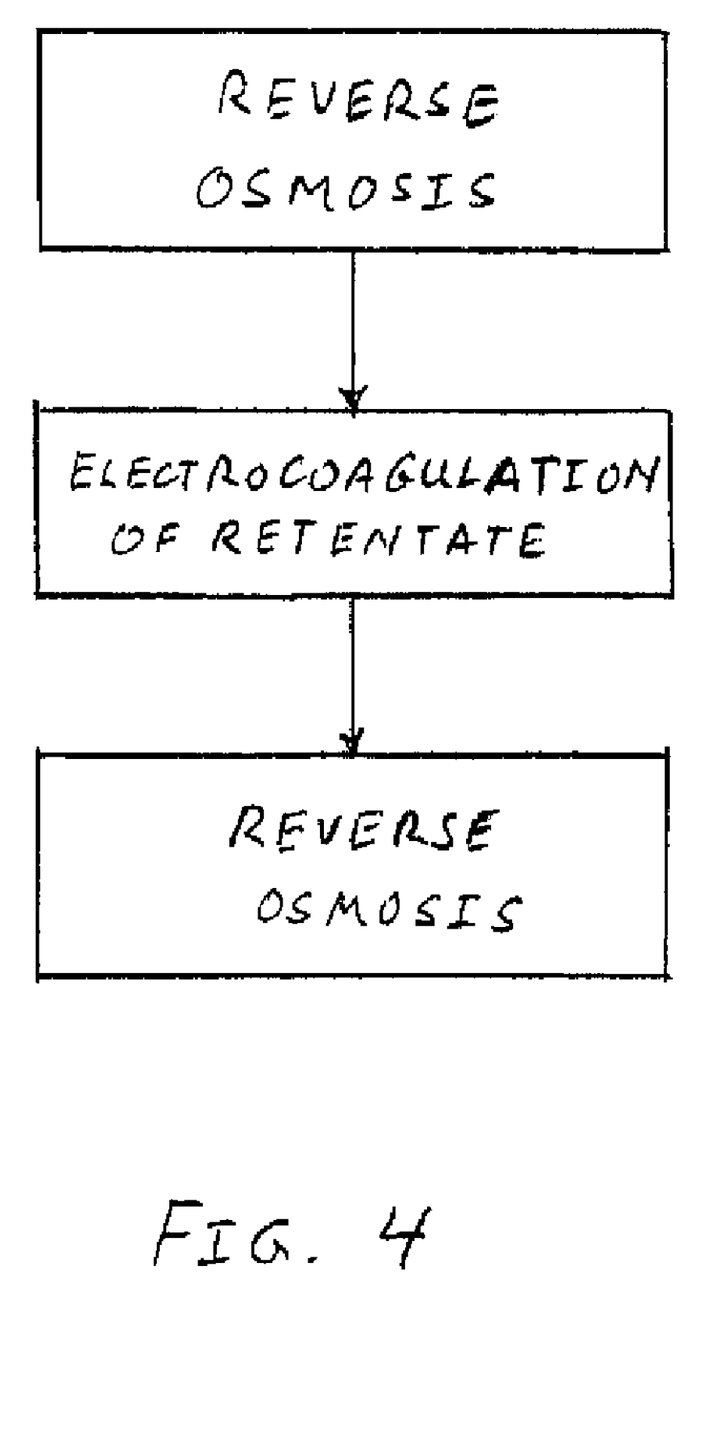
FIG. 4 shows a process block diagram of another embodiment of the invention.

A method of fluid purification is disclosed that includes a first processing step of subjecting a fluid stream to reverse osmosis followed by exposing the reverse osmosis retentate created in the first step to an electrical field and then re-processing the purified fluid with at least one subsequent round of reverse osmosis. Typically, the fluid stream for processing is an aqueous fluid stream and the interstage electrical field treatment is an electrolysis treatment of the retentate and preferably, electrocoagulation of the reverse osmosis retentate. FIG. 2 shows an example of processing with reverse osmosis, exposure of retentate to an electric field and then to reverse osmosis. FIGS. 3 and 4 show examples of processing with intermediate treatment of retentate by electrolysis or electrocoagulation, respectively.

Pre-treatment of the fluid stream prior to the initial reverse osmosis is also contemplated for methods and purification apparatus systems disclosed here. The pretreatment may include membrane filtration, mixing or injecting a treatment agent such as a scale inhibitor, an acid, a reducing agent or combinations of these treatments.

Figure 5:
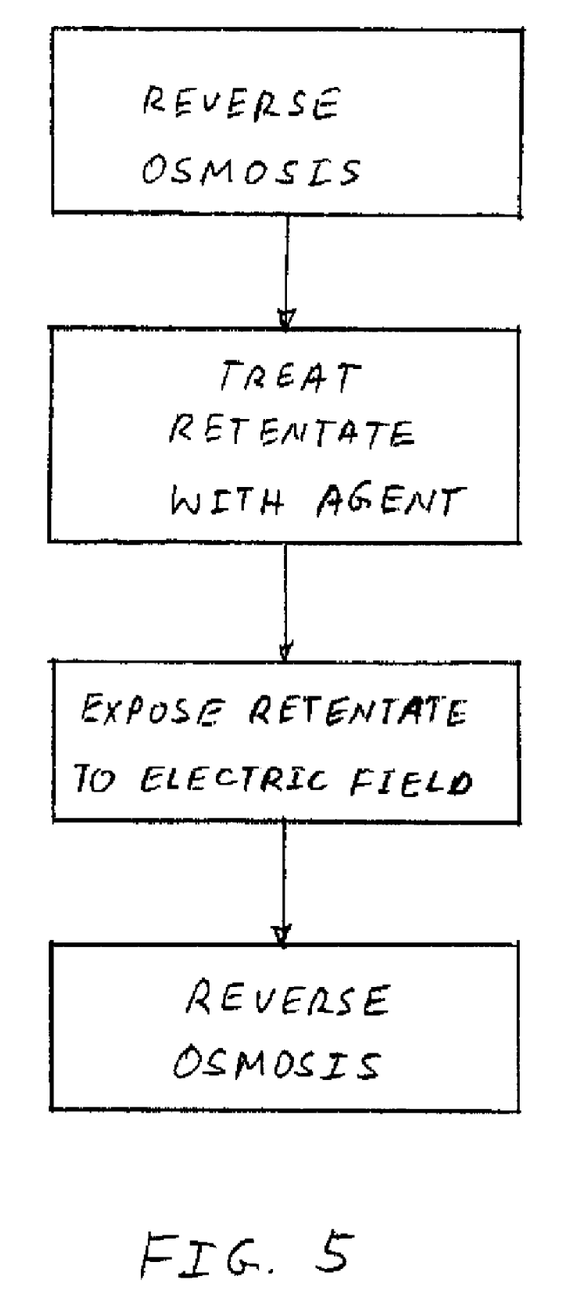
FIG. 5 shows a process block diagram of another embodiment of the invention.

The retentate recovered from the first stage reverse osmosis treatment may also be pretreated prior to the interstage electrolytic treatment. Such retentate pre-treatments may include combination with an agent such as polymer that will neutralize a scale-inhibiting polymer, an acid, a base, calcium hydroxide or combinations of these product treatments, prior to the exposing to the electric field. FIG. 5 shows an example of processing with treatment of retentate with an agent prior to exposure to an electric field.

Figure 6:
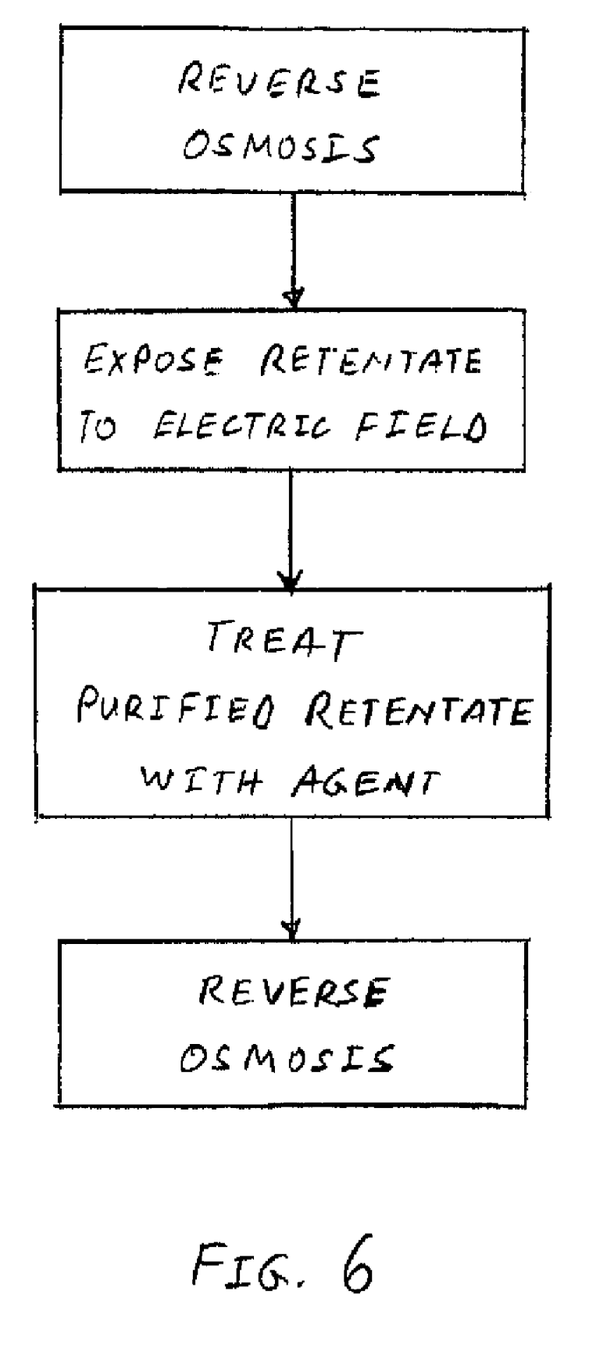
FIG. 6 shows a process block diagram of another embodiment of the invention.

Following the interstage electrical treatment, the purified retentate is recovered and that purified retentate may be treated with additional polishing purification steps prior to a second or subsequent stages of reverse osmosis. For example, the purified retentate may be combined with a polymer that will promote coagulation, an oxidizing agent, ozone, chlorine, potassium permanganate or combinations thereof. FIG. 6 shows an example of processing with treatment of purified retentate with an agent after the exposure of retentate to an electric field. Alternatively, these polishing steps may include treating the purified retentate with a filtration treatment such as membrane filtration, cartridge filtration, microfiltration, ultrafiltration, multimedia filtration, manganese dioxide filtration, KDF filtration, calcite filtration, magnesium hydroxide filtration, carbon filtration and combinations of these filtration treatments. Prior to these filtration steps, the purified retentate maybe held in a tank for a sufficient time to allow settling of solid particles.

Following the interstage electrical treatment, and any subsequent interim polishing purification steps, the fluid is then processed by at least one second-stage of reverse osmosis purification. This subsequent reverse osmosis treatment may be accomplished by returning at least a portion of the fluid stream to the first stage reverse osmosis processing apparatus.

DETAILED DESCRIPTION OF THE INVENTION

The purification systems of the present disclosure address these problems of the prior art purification systems by providing an interstage process whereby sparingly-soluble compounds are removed from the concentrate stream of a reverse osmosis system and the effluent from the process is further processed by reverse osmosis. To overcome the problems of the prior art purification systems, the methods and apparatuses of the present disclosure provide enhanced fluid purification processes that utilize electrolytic treatment methodologies between stages of reverse osmosis systems to remove sparingly-soluble salts and allow enhanced recovery. By inserting electrolytic treatments, such as electrocoagulation, internal to the reverse osmosis (RO) processing, these methods, and the apparatuses used to implement them, are suitable for use in high flow systems, work well for the purification of aqueous solutions containing multiple sparingly-soluble compounds, and are economically feasible.

The methods of the present disclosure increase the overall recovery of RO processes by allowing further concentration beyond the maximum concentration of limiting compounds in the concentrate stream. The RO system design of the present invention first attains maximum concentration of the limiting compound(s) present in the aqueous fluid by one or more stages of RO membranes and/or by the use of a concentrate recycle. Following the interstage electrolytic treatment process, one or more stages of RO membranes and/or concentrate recycle are used to further concentrate the solution. Optionally, the interstage electrolytic treatment process may be applied numerous times between different stages of a single application of RO.

In conjunction with designing the RO system for maximum recovery of limiting compounds, the pretreatment to reverse osmosis is preferably suited to attaining high recovery. Pretreatment by ultrafiltration provides the most comprehensive removal of particulate matter and therefore, the highest level of concentration. However, other suitable means may be employed to remove particulate matter depending upon the particulate load of the fluid being treated. Additional pretreatments to reverse osmosis may include the addition of scale inhibitors, acids and/or reducing agents to the fluid.

Electrocoagulation is an established practice in wastewater treatment typically used to remove heavy metals and organic compounds from wastewater. There are numerous patents describing electrocoagulation devices including U.S. Pat. Nos. 6,613,201; 6,849,178; 6,780,292; 6,663,783; 4,872,959; 4,349,431; 5,611,907; 5,587,057; 5,385,653; 6,613,217; 6,613,202; 6,746,593; 6,689,271; 6,673,321; 6,866,757; 6,800,206; 6,797,179; 6,972,077; and 6,488,835 which are incorporated herein by reference.

The electromotive force of the interstage electrolytic treatment process of the present invention may be supplied by an electrocoagualtion device. This may consist of any of the electrocoagulation devices described in the prior art or any device designed to impart electrical current into the fluid being treated. The electrical device provides electrical energy to precipitate and/or coagulate the sparingly-soluble compounds. It does this in conjunction with imparting metal ions of the electrode material into the fluids being purified. Preferably, at least one electrode in contact with the fluids to be purified includes iron, iridium-coated iron, stainless steel, titanium and/or magnesium. Most preferably, at least one electrode in contact with the fluids to be purified includes iron.

Following the precipitation and coagulation of the sparingly-soluble compounds, they are removed from the fluids. Additionally, metal ions that have dissolved in the fluid should be removed. There are a number of methods that can be utilized to separate the solids from the liquid. One embodiment of the present invention, depicted in FIG. 1, includes the solid/liquid separation and removal of dissolved metal ions. In this embodiment, there is a contact/settling tank that allows reaction time and settling time to remove a portion of the solids. Optionally, a polymer may be added to the fluid to promote agglomeration of particles.

Following the partial solids removal during the interstage electrolytic treatment, an oxidizing agent is optionally added to the purification fluid. This will change the form of dissolved metals, such as iron, in the purification fluid to insoluble forms. For example, an oxidizing agent changes iron from ferrous to ferric, ferric iron being insoluble. The purification fluid is then passed through a fine pore filtration process such as ultrafiltration membranes that have a pore size of approximately 0.05 microns. The resultant filtrate will have very little or essentially no particulate matter remaining. However, there may be some dissolved iron remaining in the purification fluid that can foul reverse osmosis membranes. Therefore, the purification fluid is subjected to an iron removal process. In a preferred embodiment, a granular bed of manganese dioxide is utilized as this media is well known to remove dissolved iron from aqueous fluids. Following this filter process, the purification fluid may be passed through cartridge filters to remove any particulate matter that may have been introduced into the purification fluid from the manganese dioxide media bed.

The purification fluid is ready for further processing by the next stage of RO. The content of sparingly-soluble compounds has been reduced by the electrocoagulation process in conjunction with solid/liquid separation and dissolved iron removal.

At this point, it may be beneficial to further reduce the concentration of sparingly-soluble compounds by additional treatment. This depends on the actual concentration of the remaining sparingly-soluble compounds and the overall ionic content of the fluid. If the osmotic pressure limit of concentrating the fluid can be attained without fouling by sparingly-soluble compounds, further treatment has no benefit. If the sparingly-soluble compounds remain a limiting factor to attaining maximum concentration, additional benefits may be obtained through further treatment.

Further treatment may be accomplished by continuing through the next stage of reverse osmosis and then utilizing the interstage electrolytic treatment process again, followed by another stage of reverse osmosis. Also, an alternative method of removal of sparingly-soluble compounds may be utilized. A standard cation exchange resin in the sodium form may be employed to remove hardness compounds. Whereas this method would be relatively costly due to the need to exchange every ion removed on a one to one basis with sodium in the absence of the interstage electrolytic treatment, as a polishing process ion exchange can be utilized more cost effectively. Other high cost methods of removing sparingly-soluble compounds would also be more cost effective after the interstage electrocoagulation process has performed the bulk of the removal of sparingly-soluble compounds.

Additional treatments that may be used to further reduce the concentration of sparingly-soluble compounds following the interstage electrolytic treatment process include, but are not limited to, addition of a polymer to the fluid to promote coagulation, the injection of an oxidizing agent that may include ozone, chlorine, potassium pennanganate or combinations of these agents, storage tank holding to allow solid particles to settle out of the fluid, membrane filtration such as cartridge filtration, ultrafiltration and/or microfiltration, multimedia filtration that may include manganese dioxide filtration, kinetic degredation fluxion (KDF) filtration, calcite filtration, magnesium hydroxide filtration and/or carbon filtration. These interstage treatments act as pretreatment to the second stage reverse osmosis and, depending upon the fluid input and polishing requirements may be used in series or in any suitable combination to further polish the fluid exiting the interstage electrolytic treatment prior to subsequent stages of reverse osmosis.

In one preferred embodiment of the present invention the maximum concentration in a RO process is achieved by performing a first stage of RO processing followed by an electrolytic treatment of the RO retentate to reduce the amount of sparingly soluble contaminants present in the retentate. The purified retentate is then recycled to the inlet of the first stage RO processing unit. The preferred electrolytic treatment used in this embodiment includes electrocoagulation. Additional treatments, in addition to the electrolytic treatment, may be utilized following the first stage of RO processing to further reduce the concentration of sparingly-soluble compounds as described above.

In another preferred embodiment, the maximum concentration in a RO process is achieved by performing a first stage RO processing followed by electrolytic treatment of the RO retentate to precipitate the amount of sparingly-soluble contaminants present in the retentate, followed by a second stage RO processing unit. No electrolytically-purified retentate is recycled to the first stage RO process. In each separate RO processing stage, the RO system is designed and controlled to achieve the maximum concentration without fouling of the RO membranes. This is achieved via control over the design and layout of the membrane array and by controlling the temperature of the processing steps, the timing and amount of acid and/or antiscalent injections and the flow of concentrate and permeate fluids, as well as the timing and extent of membrane cleanings. The preferred electrolytic treatment used in this embodiment includes electrocoagulation. Additional treatments, in addition to the electrolytic treatment, may be utilized following the first stage of RO processing to further reduce the concentration of sparingly-soluble compounds as described above.

In another preferred embodiment, the maximum concentration in a RO process is achieved by performing a first stage RO processing followed by electrolytic treatment of the RO retentate to precipitate the amount of sparingly-soluble contaminants present in the retentate, followed by a second stage RO processing unit. No electrolytically-purified retentate is recycled to the first stage RO process. In each separate RO processing stage, the RO system is designed and controlled to achieve the maximum concentration without fouling of the RO membranes. This is achieved via control over the design and layout of the membrane array and by controlling the temperature of the processing steps, the timing and amount of acid and/or antiscalent injections and the flow of concentrate and permeate fluids, as well as the timing and extent of membrane clearings. The preferred electrolytic treatment used in this embodiment includes electrocoagulation. Additional treatments, in addition to the electrolytic treatment, may be utilized following the first stage of RO processing to further reduce the concentration of sparingly-soluble compounds as described above.

Figure 1:
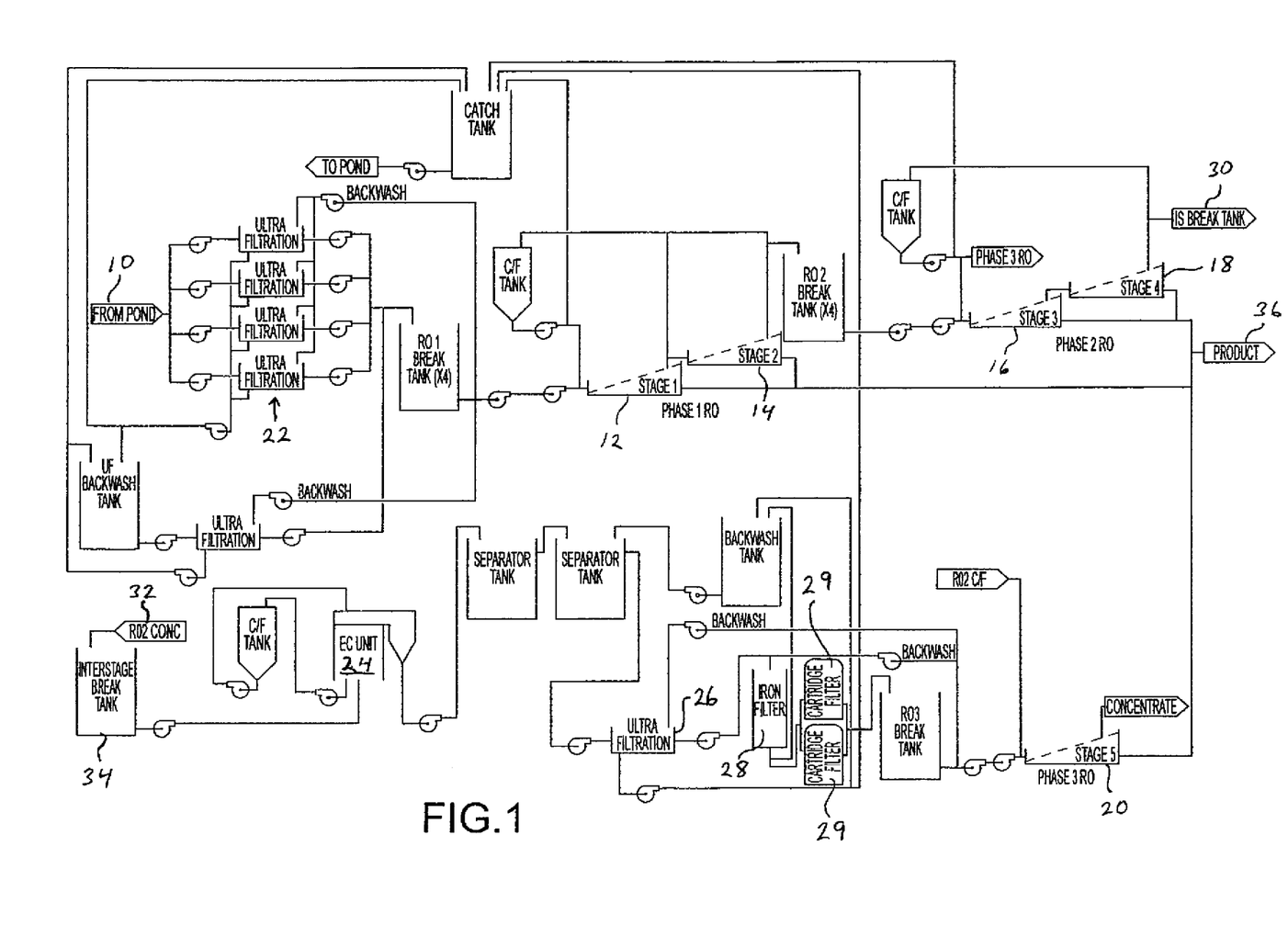
FIG. 1 is a schematic diagram of one preferred fluid purification system of the present invention.

FIG. 1 is a schematic diagram of a purification system treating fluid from a pond 10. The system includes five reverse osmosis stages 12, 14, 16, 18, 20 arranged in three phases of reverse osmosis treatment (PHASE 1 RO, PHASE 2 RO and PHASE 3 RO). The fluid from the pond 10 is subjected to ultrafiltration 22 prior to the Phase 1 RO.

Between the fourth reverse osmosis stage 18 and the fifth reverse osmosis stage 20 is an electrocoagulation unit 24 (EC UNIT). After the electrocoagulation unit 24, fluid is subjected to ultrafiltration 26, iron filter 28 and cartridge filters 29 prior to the fifth reverse osmosis stage 20. Flow including retentate from the fourth reverse osmosis stage 18 (in Phase 2 RO), is shown by an arrow 30 labeled "IS BREAK TANK" (upper right of FIG. 1), and by a corresponding arrow 32 labeled "RO2 CONC" shown feeding into the interstage break tank 34 (lower left of FIG. 1). Product 36 from the system includes combined permeate from the five reverse osmosis stages 12, 14, 16, 18, 20.

The foregoing disclosure of fluid purification technologies has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best mode known for practicing the invention and to enable others skilled in the art to utilize the invention in such, or other, embodiments and with various modifications required by the particular applications or uses of the present invention.

What is claimed is:
1. A method of fluid purification comprising:
  a. processing a fluid stream by a first reverse osmosis stage to create a reverse osmosis retentate;
  b. electrocoagulation treatment of at least a portion of the reverse osmosis retentate to an electric field to create a purified retentate;
  c. after the electrocoagulation treatment, contacting the purified retentate with a polymer capable of promoting coagulation of sparingly-soluble compounds;
  d. after the exposing, first injecting a first oxidizing agent selected from the group consisting of ozone, chlorine, potassium permanganate and combinations thereof, into the purified retentate;
  e. after the contacting and first injecting, holding the purified retentate in a tank to allow settling of solid particles;
  f. after the holding, first filtering the purified retentate with a first filtration treatment selected from the group consisting of ultrafiltration and microfiltration;
  g. after the first filtering, second injecting a second oxidizing agent selected from the group consisting of ozone, chlorine, potassium permanganate and combinations thereof, into the purified retentate;
  h. after the second injecting, third filtering the purified retentate with a multimedia filtration treatment selected from the group consisting of manganese dioxide filtration, KDF filtration, calcite filtration, magnesium hydroxide filtration, carbon filtration and combinations of these filtration treatments;
  i. after the third filtering, fourth filtering the purified retentate with a second filtration treatment selected from the group consisting of cartridge filtration, ultrafiltration and microfiltration; and,
  j. after the fourth filtering, processing at least a portion of the purified retentate by a second reverse osmosis stage to create a purified fluid.

2. The method of claim 1, wherein the fluid stream is an aqueous fluid stream.

3. The method of claim 1, wherein the fluid stream is pretreated by combining with an agent selected from the group consisting of a scale inhibitor, an acid, a reducing agent and combinations thereof, prior to the processing by the first reverse osmosis stage.

4. The method of claim 1, wherein the reverse osmosis retentate is combined with an agent selected from the group consisting of a polymer that will neutralize a scale-inhibiting polymer, an acid, a base, calcium hydroxide and combinations thereof, prior to the exposing to the electric field.

5. The method of claim 1, wherein at least a portion of the purified retentate is returned to combine with the fluid stream to be processed by the first reverse osmosis stage.

6. The method of claim 1, wherein the electrocoagulation treatment comprises adding dissolved metal ions of electrode material into the at least a portion of the retentate being treated during the electrocoagulation.

* * * * *